US008063597B2

(12) United States Patent
Thomsen

(10) Patent No.: US 8,063,597 B2
(45) Date of Patent: Nov. 22, 2011

(54) ELECTRIC CIRCUIT PROVIDING PROTECTION FROM TRANSIENTS

(75) Inventor: Rune Thomsen, Loegumkloster (DK)

(73) Assignee: Secop GmbH, Flensburg (DE)

( * ) Notice: Subject to any disclaimer, the term of this patent is extended or adjusted under 35 U.S.C. 154(b) by 847 days.

(21) Appl. No.: 11/856,847

(22) Filed: Sep. 18, 2007

(65) Prior Publication Data

US 2008/0074064 A1 Mar. 27, 2008

(30) Foreign Application Priority Data

Sep. 21, 2006 (DK) .................................. 2006 01219

(51) Int. Cl.
*H02H 7/09* (2006.01)
(52) U.S. Cl. ................. 318/400.22; 320/137; 320/163; 320/166; 363/56.03; 363/56.04; 361/23; 361/91.6
(58) Field of Classification Search .................. 257/322; 320/163, 166, 137; 318/400.01, 400.1, 400.21, 318/400.22, 400.26; 3/322; 363/1, 56.03, 363/56.04, 56.12; 361/23, 91.6, 94, 111, 361/155, 117, 118
See application file for complete search history.

(56) References Cited

U.S. PATENT DOCUMENTS

| | | | |
|---|---|---|---|
| 4,710,685 A | | 12/1987 | Lehnhoff et al. |
| 5,109,162 A | * | 4/1992 | Koch et al. ................ 307/127 |
| 5,119,265 A | * | 6/1992 | Qualich et al. ............. 361/103 |
| 5,463,521 A | | 10/1995 | Love |
| 5,539,299 A | * | 7/1996 | Fernandez et al. .......... 320/163 |
| 5,637,413 A | * | 6/1997 | Fernandez et al. .......... 429/7 |
| 5,705,911 A | * | 1/1998 | Tamai ....................... 320/134 |
| 5,742,498 A | * | 4/1998 | Taniguchi et al. .......... 363/145 |
| 5,867,008 A | * | 2/1999 | Du et al. .................... 320/136 |

(Continued)

FOREIGN PATENT DOCUMENTS

EP 1 357 658 A1 10/2003

(Continued)

OTHER PUBLICATIONS

Mohan/Undeland/Robbins, Power Electronics- Converters, Applications and Design, 1989, 1995, 2nd Edition, pp. 590-592.*

(Continued)

*Primary Examiner* — Walter Benson
*Assistant Examiner* — Antony M Paul
(74) *Attorney, Agent, or Firm* — McCormick, Paulding & Huber LLP

(57) ABSTRACT

An electric circuit for supplying power to a DC application is disclosed. The electric circuit comprises a DC power source (1) connectable to an alternator charging circuit (2), an FET (T7), and a capacitor (8) connected across the gate terminal and the source terminal of the FET (T7). The drain terminal of the FET (T7) is connected to a negative terminal of the DC source (1). The FET (T7) protects the circuit against accidental connection of the alternator charging circuit (2) to the DC power source (1) with reversed polarity, by opening a switch (6) of the FET (T7) when this occurs. The capacitor (8) protects the FET (T7) from being pushed into avalanche in case a load-dump transient occurs. This is because the capacitor (8) in this case will charge and discharge, thereby introducing a time delay before the switch (6) is opened. Protection against load-dump transients is thereby obtained by means of a small component with low energy dissipation. Thereby the size of the circuit is reduced and energy is conserved.

7 Claims, 2 Drawing Sheets

U.S. PATENT DOCUMENTS

| | | | |
|---|---|---|---|
| 5,898,293 A * | 4/1999 | Tamai et al. | 320/136 |
| 5,949,218 A * | 9/1999 | Colles et al. | 320/134 |
| 6,125,798 A | 10/2000 | Kuwayama et al. | |
| 6,154,081 A | 11/2000 | Pakkala et al. | |
| 6,331,763 B1 * | 12/2001 | Thomas et al. | 320/136 |
| 6,456,514 B1 * | 9/2002 | Perreault et al. | 363/89 |
| 6,541,943 B1 * | 4/2003 | Wylie et al. | 322/28 |
| 7,309,928 B2 * | 12/2007 | Grant et al. | 290/1 A |
| 7,310,006 B2 * | 12/2007 | Shimada | 326/83 |
| 7,400,111 B2 * | 7/2008 | Kishibata et al. | 320/104 |
| 2003/0222499 A1 | 12/2003 | Ely et al. | |
| 2006/0267552 A1 * | 11/2006 | Baer et al. | 320/128 |

FOREIGN PATENT DOCUMENTS

| | | |
|---|---|---|
| JP | 4105515 | 4/1992 |
| JP | 4190622 | 7/1992 |
| JP | 4364357 | 12/1992 |

OTHER PUBLICATIONS

Floyd, Electronic Devices, 1996, Prentice-Hall, Inc., Fourth Edition, p. 458.*

Danish Search Report, No. PA 2006 01219, dated May 1, 2007.

* cited by examiner

ELECTRIC CIRCUIT PROVIDING PROTECTION FROM TRANSIENTS

CROSS REFERENCE TO RELATED APPLICATIONS

Applicant hereby claims foreign priority benefits under U.S.C. §119 from Danish Patent Application No. PA 2006 01219 filed on Sep. 21, 2006, the contents of which are incorporated by reference herein.

FIELD OF THE INVENTION

The present invention relates to an electric circuit for supplying power to a direct current (DC) application. More particularly, the present invention relates to an electric circuit as defined above which is capable of providing protection for the components of the electric circuit in the case that an alternator charging circuit is accidentally connected to a battery of the electric circuit with reversed polarity.

BACKGROUND OF THE INVENTION

Battery driven electronic equipment, e.g. mobile electronic equipment, such as equipment positioned in vehicles, can be subjected to high energy voltage transients, e.g. if the battery is accidentally disconnected from an alternator charging circuit. Such voltage transients are sometimes referred to as 'load-dump transients', and they may cause severe damage to the equipment. It is therefore desirable to protect the equipment from such transients.

In the prior art, three different approaches have been used in order to protect electronic equipment from load-dump transients.

A bi-directional diode positioned at the input of the electronic unit.

A MOSFET positioned in the positive rail of the battery.

A relay positioned in the positive rail of the battery.

Although providing the desired protection, all of these solutions result in the use of relatively bulky components which additionally introduce substantive power losses in the electric circuit. Accordingly, a bulky and energy consuming circuit is the result. This is very disadvantageous.

Furthermore, it is desirable to maintain the possibility of protecting the electronic application from damages occurring in the case that an alternator charging circuit is accidentally connected to the DC power source with a reversed polarity. In this case the circuit should be interrupted, thereby preventing a current from running in the circuit. This may be done using a field effect transistor (FET).

SUMMARY OF THE INVENTION

It is, thus, an object of the invention to provide an electric circuit which provides protection against load-dump transients, and which is more compact than similar prior art electric circuits.

It is a further object of the invention to provide an electric circuit which provides protection against load-dump transients, and which is less energy consuming than similar prior art electric circuits.

It is an even further object of the invention to provide an electric circuit which provides protection against load-dump transients while maintaining the possibility of protecting against accidental reversed polarity of an alternator charging circuit connected to a DC source of the circuit.

According to the invention the above and other objects are fulfilled by providing an electric circuit for supplying power to a DC application, the electric circuit comprising:

a direct current (DC) power source comprising a set of terminals, the DC power source further being connectable to an alternator charging circuit, a field effect transistor (FET) comprising a drain terminal, a source terminal and a gate terminal, the FET being connected to the terminals of the DC power source in such a manner that the drain terminal of the FET is connected to a negative terminal of the DC power source, and a capacitor connected across the gate terminal and the source terminal of the FET, the capacitor, in combination with an internal capacitance of the gate terminal of the FET, defining a capacitance, C.

The alternator charging circuit is adapted to charging the DC power source. It may be or comprise a motor. In the case that the electric circuit is used for supplying power to a mobile application positioned in a vehicle or vessel, e.g. a car, a truck, a boat, an air plane, etc., the alternator circuit may be or comprise a motor used for driving the vehicle or vessel.

The FET is connected to the terminals of the DC power source in such a manner that the drain terminal of the FET is connected to a negative terminal of the DC power source. Thereby the FET is adapted to protect the electric circuit as well as the DC application being supplied by means of the electric circuit against damage and other adverse effects in the case that an alternator charging circuit is accidentally connected to the DC power source with reversed polarity. This is obtained in the following manner.

In the case that an alternator charging circuit is accidentally connected to the DC power source with reversed polarity the voltage drop between the gate terminal and the source terminal of the FET will decrease below a threshold value, and this will cause a switch of the FET to open. Thereby the circuit is interrupted, and it is not possible for a current to run in the circuit. Accordingly, the components of the circuit as well as the application being supplied by means of the circuit are protected.

In the case that the alternator charging circuit is accidentally disconnected from the DC power source, thereby causing a load-dump transient to occur, the above scenario will also take place, i.e. the switch of the FET will open in order to prevent a current from running in the circuit. However, a load-dump transient will normally have a sufficiently high voltage to pass a rectifying diode positioned in the FET, thereby pushing the FET into avalanche, and this may cause serious damage to the FET as well as to other components of the circuit and/or of the DC appliance being supplied by means of the circuit.

According to the invention the above problem is solved by connecting a capacitor across the gate terminal and the source terminal of the FET. When a reversed polarity or a load-dump transient occurs the capacitor will be charged and, subsequently, gradually discharged. Accordingly, the voltage drop between the gate terminal and the source terminal of the FET does not decrease immediately, but gradually. Thus, there will be a time delay before the voltage drop reaches the threshold value, and thereby a time delay before the switch of the FET is opened. Since transients are normally of a short duration, this time delay will be sufficiently long to allow a load-dump transient to pass the FET via the closed switch, and it is thereby prevented that the FET is pushed into avalanche. On the other hand, since the switch will be opened after the time delay it is still ensured that the components of the circuit and/or the DC application are protected in the case that an alternator charging circuit is accidentally connected to the DC power source with reversed polarity, as described above.

Thus, according to the invention an electric circuit has been provided which is capable of protecting the components of the circuit as well as an application being supplied by means of the circuit from damages and other adverse effects resulting from reversed polarity as well as load-dump transients. Furthermore, this is obtained by means of a capacitor which is a much smaller component than the ones previously used for this purpose, and the power loss is also considerably reduced because a much smaller amount of energy is dissipated in a capacitor than in the previously used components. Accordingly, a less bulky circuit which is energy conserving is obtained.

The FET may advantageously be a metal oxide semiconductor field effect transistor (MOSFET). Alternatively, an IGBT could be used.

The electric circuit may further comprise a diode connected between the positive terminal of the DC power source and the gate terminal of the FET. The diode can be used for controlling the length of the time delay caused by the presence of the capacitor because the diode, when positioned correctly, will prevent the capacitor from discharging immediately.

Alternatively or additionally, the electric circuit may further comprise a resistor having a resistance, R, connected between the positive terminal of the DC power source and the gate terminal of the FET. In this case the capacitance, C, and the resistance, R, defines a time constant, $\tau = R \cdot C$, defining the time delay elapsing before the switch of the FET is opened. The capacitance, C, and the resistance, R, should be selected in such a manner that a desired time delay is obtained. The time delay should preferably be sufficiently long to allow transients of an expected duration to pass, and sufficiently short to prevent damages to components due to an accidental reversed polarity.

It should be noted, that the capacitance, C, is the combined capacitance of the capacitor and an internal capacitance of the gate terminal of the FET. Thus, C is the effective capacitance of the capacitor, i.e. the capacitance 'seen' by the electric circuit.

The capacitance, C, and the resistance, R, may be selected in such a manner that $\tau = R \cdot C$ is within the time interval 1 ms to 20 ms, such as between 2 ms and 17 ms, such as between 5 ms and 15 ms, such as approximately 10 ms. Alternatively, the capacitance, C, and the resistance, R, may be selected in such a manner that a time delay of another length which is suitable in the specific situation is obtained.

The DC power source may advantageously be a battery. This will normally be the case if the application being supplied by means of the electric circuit is positioned in a vehicle or a vessel as described above.

The electric circuit may be adapted to supplying power to a DC motor, such as a brushless DC motor.

BRIEF DESCRIPTION OF THE DRAWINGS

The invention will now be described in further details with reference to the accompanying drawings in which.

DETAILED DESCRIPTION OF THE DRAWINGS

Figure 1:
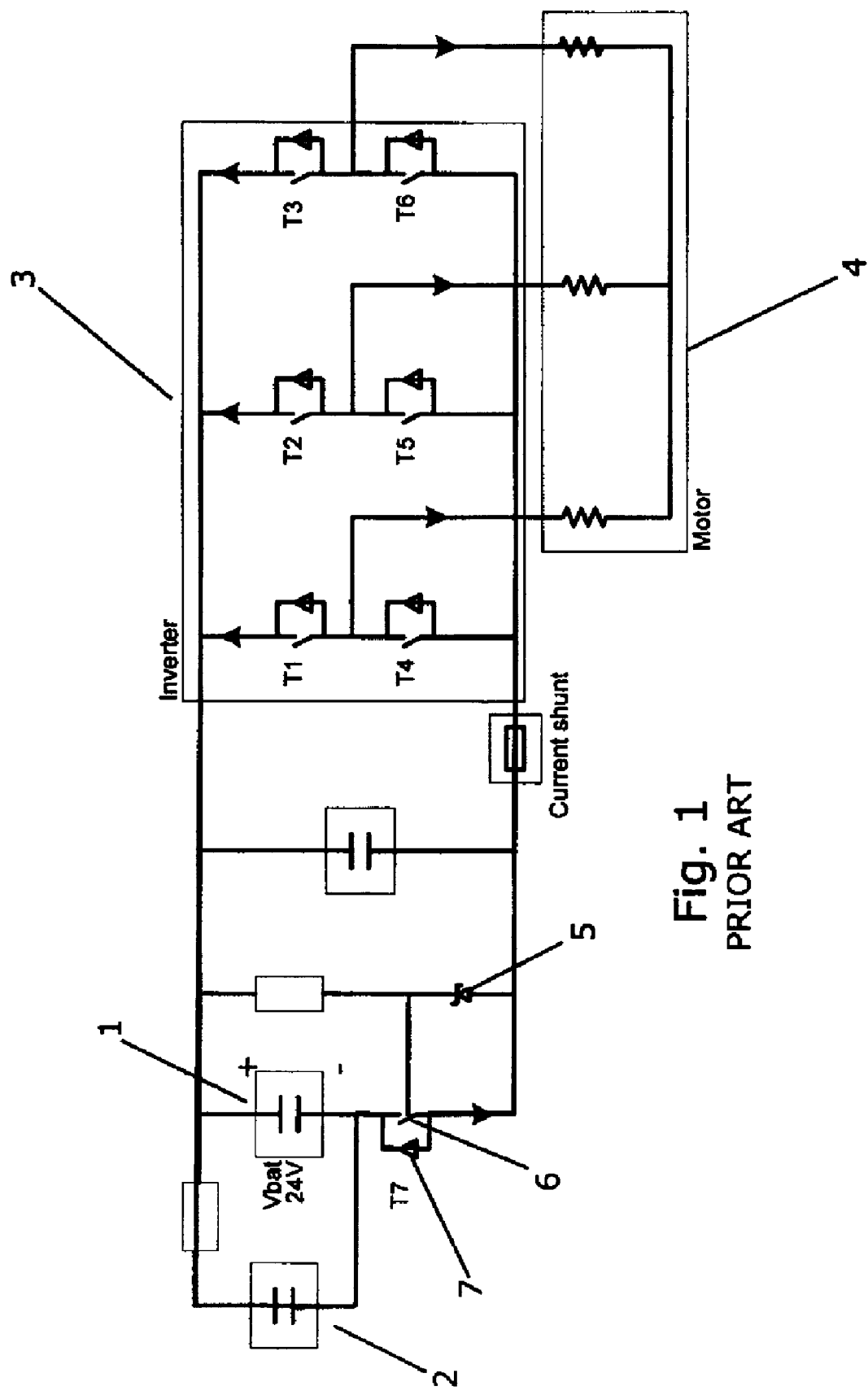
FIG. 1 is a diagram of a prior art electric circuit illustrating the current flow during a load-dump transient.

FIG. 1 is a diagram of a prior art electric circuit comprising a DC power source 1 connected to an alternator charging circuit 2. The electric circuit is connected to an inverter 3 which in turn is connected to three motor coils of a DC motor 4. The inverter comprises six switching devices T1-T6 for controlling commutation of the motor coils. A drain terminal of a protection MOSFET T7 is connected to a negative terminal of the DC power source 1. The gate terminal and the source terminal of the protection MOSFET T7 are both connected to a positive terminal of the DC source 1. A zener diode 5 is connected between the gate terminal and the source terminal of the protection MOSFET T7. The zener diode 5 controls opening of an internal switch 6 of the MOSFET T7 in case of a reversed polarity as described above.

In the case that the alternator charging circuit 2 is accidentally disconnected from the DC power source 1 a load-dump transient will occur as described above. This will cause the internal switch 6 of the protection MOSFET T7 to open. However, the voltage of the load-dump transient will normally be sufficiently high to pass through internal diode 7 of the protection MOSFET T7, thereby pushing the protection MOSFET into avalanche. As a result, a current will flow through the electric circuit via the path indicated by the arrows, and there is a substantial risk of damage to the components of the electric circuit, in particular to the protection MOSFET T7.

Figure 2:
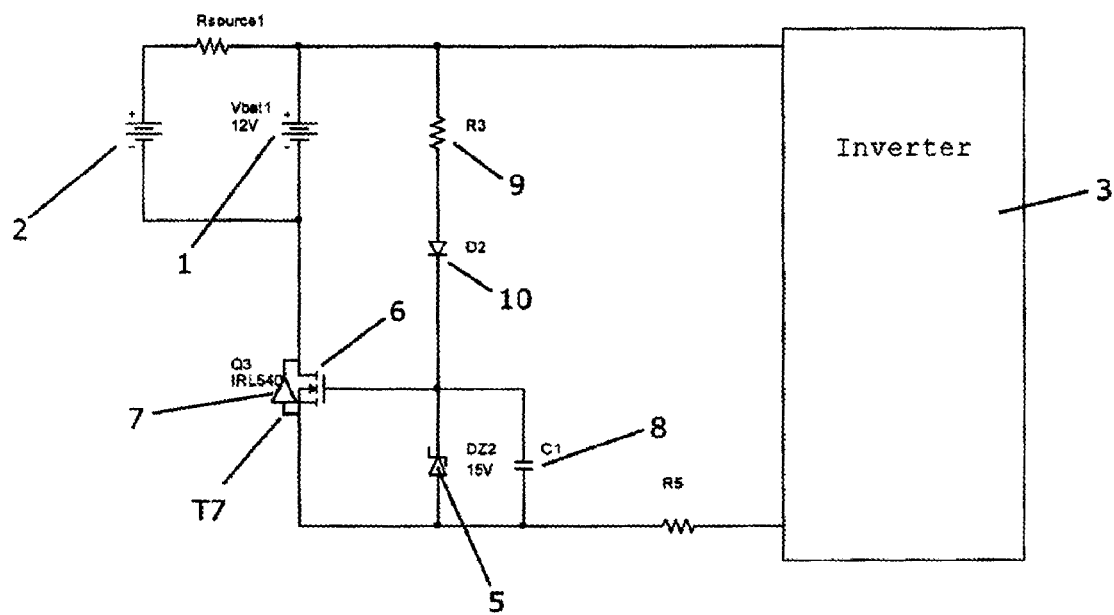
FIG. 2 is a diagram of an electric circuit according to an embodiment of the invention.

FIG. 2 is a diagram of an electric circuit according to an embodiment of the invention. The diagram is similar to the diagram of FIG. 1, and corresponding parts have therefore been provided with like reference numerals.

In the diagram of FIG. 2 a capacitor 8 has been connected across the gate terminal and the source terminal of the protection MOSFET T7, i.e. in parallel with the zener diode 5. In the case that a load-dump transient occurs, the capacitor 8 will be charged, and subsequently discharged, and this will delay the opening of the internal switch 6 of the protection MOSFET T7 as described above.

The electric circuit also comprises a resistor 9 and a diode 10 connected between a positive terminal of the DC power source 1 and the gate terminal of the protection MOSFET T7. By selecting the resistance of the resistor 9 and the capacitance of the capacitor 8 appropriately a desired time delay can be obtained as described above. The time delay should be sufficiently long to allow a load-dump transient to pass the protection MOSFET T7 before the internal switch 6 is opened, and sufficiently short to prevent damage caused by a reversed polarity of the alternator charging circuit 2.

Figure 3:
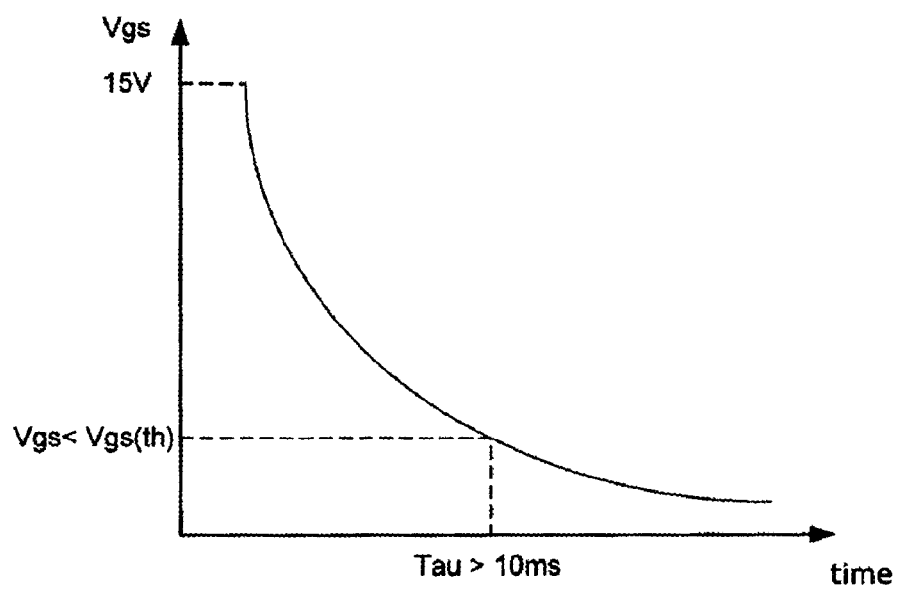
FIG. 3 is a graph illustrating the time delay occurring as a consequence of the presence of a capacitor in an electric circuit according to an embodiment of the invention.

FIG. 3 is a graph illustrating the time delay occurring as a consequence of the presence of a capacitor in an electric circuit according to an embodiment of the invention. The electric circuit could advantageously be the electric circuit of FIG. 2, and the reference numerals in the following accordingly refer to FIG. 2. The graph shows the voltage drop $V_{gs}$ between the gate terminal and the source terminal of the protection MOSFET T7 as a function of time. Initially the voltage drop is approximately 15 V, and the internal switch 6 of the protection MOSFET T7 is closed. A load-dump transient or a reversed polarity occurs, and the capacitor charges and discharges as described above. During the discharge of the capacitor the voltage drop $V_{gs}$ decreases until it reaches a threshold value, $V_{gs(th)}$. In the graph of FIG. 3 this occurs after approximately 10 ms. At this point the internal switch 6 of the protection MOSFET T7 opens as described above.

While the present invention has been illustrated and described with respect to a particular embodiment thereof, it should be appreciated by those of ordinary skill in the art that various modifications to this invention may be made without departing from the spirit and scope of the present invention.

What is claimed is:

1. An electric circuit for supplying power to a DC application, the electric circuit comprising:
    a direct current (DC) power source comprising a set of terminals, the DC power source further being connectable to an alternator charging circuit,
    a field effect transistor (FET) comprising a drain terminal, a source terminal and a gate terminal, wherein the drain terminal of the FET is connected to a negative terminal of the DC power source,
    a capacitor connected across the gate terminal and the source terminal of the FET, the capacitor, in combination with an internal capacitance of the gate terminal of the FET, defining a capacitance, C; and
    a diode connected between the positive terminal of the DC power source and the gate terminal of the FET.

2. The electric circuit according to claim 1, wherein the FET is a metal oxide semiconductor field effect transistor (MOSFET).

3. The electric circuit according to claim 1, further comprising a resistor having a resistance, R, connected in series between the positive terminal of the DC power source and an anode of the diode, wherein a cathode of the diode is connected to the gate terminal of the FET.

4. The electric circuit according to claim 1, wherein the DC power source is a battery.

5. The electric circuit according to claim 1, wherein the electric circuit is adapted to supplying power to a DC motor.

6. The electric circuit according to claim 5, wherein the electric circuit is adapted to supplying power to a brushless DC motor.

7. An electric circuit for supplying power to a DC application, the electric circuit comprising:
    a direct current (DC) power source comprising a set of terminals, the DC power source further being connectable to an alternator charging circuit,
    a field effect transistor (FET) comprising a drain terminal, a source terminal and a gate terminal, the FET being connected to the terminals of the DC power source in such a manner that the drain terminal of the FET is connected to a negative terminal of the DC power source,
    a capacitor connected across the gate terminal and the source terminal of the FET, the capacitor, in combination with an internal capacitance of the gate terminal of the FET, defining a capacitance, C, and
    a resistor having a resistance, R, connected in series between the positive terminal of the DC power source and an anode of the diode, wherein a cathode of the diode is connected to the gate terminal of the FET,
    wherein the capacitance, C, and the resistance, R, are selected in such a manner that $\tau = R \cdot C$ is within the time interval 1 ms to 20 ms.

* * * * *